US006167867B1

(12) United States Patent
Garrick

(10) Patent No.: US 6,167,867 B1
(45) Date of Patent: Jan. 2, 2001

(54) THROTTLE LEVER ASSEMBLY

(75) Inventor: Robert David Garrick, Rochester, NY (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/298,303

(22) Filed: Apr. 23, 1999

(51) Int. Cl.[7] .............................. F16K 1/22; F02D 11/04

(52) U.S. Cl. ...................... 123/400; 123/339.13; 251/308

(58) Field of Search .............................. 123/400, 339.13; 251/262, 263, 286, 287, 288, 305, 308

(56) References Cited

U.S. PATENT DOCUMENTS 4,509,720 * 4/1985 Griffin et al. ........................ 251/308
4,907,553 * 3/1990 Porter .................................. 123/400
5,078,111 * 1/1992 Mccann ................................ 123/400
5,263,449 * 11/1993 Swartzendruber ................... 123/400
5,275,375 * 1/1994 Semence ............................. 251/308
5,524,590 * 6/1996 Jung .................................... 123/400
5,584,273 * 12/1996 Halsig ................................. 123/400
5,666,988 * 9/1997 Becker ................................ 251/308
5,746,177 * 5/1998 Criss et al. .......................... 251/308
5,762,044 * 6/1998 Hollister et al. ..................... 123/400
6,009,772 * 1/2000 Papenhagen et al. ............... 123/400

* cited by examiner

*Primary Examiner*—Erick Solis
(74) *Attorney, Agent, or Firm*—John A. Vanophem

(57) ABSTRACT

A throttle lever assembly for controlling the actuation of a throttle valve in an internal combustion engine has a throttle shaft pivotally secured to a housing. An idle stop lever is mounted to and radially extends from an end portion of the shaft for engaging a depending member of the housing to stop the rotation of the throttle lever assembly at an idle position. A return cam formed of thermoplastic/thermoset material is overmolded the end portion of the shaft and a portion of the idle stop lever. The molded return cam has a channel disposed about its cam surface for receiving an accelerator cable, a stud extending axially from the outer surface of the cam return, and a spring retainer extending axially from the inner surface of the return cam for maintaining a return spring in coaxial relationship with the shaft. The return cam may also include an idle stop member to replace the discrete idle stop lever. This fully integrated return cam is secured to the shaft by overmolding the return cam to the shaft which has grooves disposed transversely there across which function to prevent axial and rotational translation of the return cam relative to the shaft.

12 Claims, 5 Drawing Sheets

THROTTLE LEVER ASSEMBLY

TECHNICAL FIELD

The present invention relates to a throttle lever assembly for controlling the delivery of air to the combustion chamber of an internal combustion engine.

BACKGROUND OF THE INVENTION

In a conventional air/fuel system for an internal combustion engine, a throttle body assembly provides a means for controlling the air provided to the engine in response to the operator's actuation of an accelerator pedal and/or command from a cruise control system. Generally, the throttle body includes a lever assembly mounted pivotally to a throttle housing that controls the opening of a throttle valve. The degree of rotation of the lever assembly is directly proportional to the opening of the throttle valve which provides air to the engine.

Typically, the throttle lever assembly has a number of components and subassemblies attached to a throttle shaft, each of which perform a specific function. One such subassembly is a return cam mounted to one end of the shaft. The cam alters the engine's acceleration in response to input provided by the operator. The cam may be formed of plastic molded onto a metal insert, or two metallic pieces joined together. The return cam includes a U-shaped channel for receiving one end of an accelerator cable which has another end interconnected to the accelerator pedal.

When the accelerator pedal is depressed, the cable is retracted to rotate the lever assembly to open the throttle valve which increases the amount of air provided to the engine. The lever assembly is rotated back to its initial or idle position by a return spring when the accelerator pedal is released or pressure on the pedal is reduced. The return spring is maintained coaxially about the shaft by a spring retainer mounted to the shaft inboard of the throttle cam.

The return cam throttle lever assembly also includes an idle stop lever which is secured to the shaft, abutting the return cam. The idle stop lever extends radially from the shaft and is oriented to engage an idle stop screw threaded within a depending member of the throttle housing at an idle position, wherein the throttle valve is opened a small amount. The idle stop screw is used to adjust the idle position of the lever assembly. The idle stop lever may also include a second engagement surface to provide a wide open throttle stop for the lever assembly.

The lever assembly may also include a cruise control lever or cam mounted to the end of the shaft, abutting the return cam. The lever extends radially from the shaft at a predetermined angle and distance to engage a cable or linkage of the cruise control system which provides control of the throttle body independently of the operator input. A stud extends axially outward from the end of the idle lever to provide a means to engage the linkage or cable of the cruise control system.

The lever assembly, return cam and idle stop lever are secured to the end of the shaft by assembling each of the subassemblies onto the shaft and spinning or expanding the end of the shaft to secure the subassemblies thereto. Each of the subassemblies have a central bore shaped to receive the end of the shaft having a complimentary shape. To maintain the subassemblies in a fixed radial relation to each other, the shaft is milled to form a "D" or "double D" profile.

This throttle lever assembly functions adequately for its intended purpose, however, the assembly requires a number of subassemblies and steps to manufacture the throttle lever assembly. Consequently, the process of manufacturing and assembling the throttle assembly is costly and time consuming.

SUMMARY OF THE INVENTION

The present invention provides a relatively inexpensive solution to reduce the number of components and subassemblies required to produce a throttle lever assembly for use in a throttle body by incorporating the components into a return cam that is overmolded onto a throttle shaft. An object of the present invention may be to provide a throttle lever assembly having a return cam that may be overmolded onto one end portion of the shaft and a portion of the idle stop lever, secured to the shaft, to secure the return cam in fixed relation relative to the shaft and idle stop lever assembly to reduce the number of components required for the throttle lever assembly.

Another object of the present invention may be to provide a throttle body having a throttle lever assembly wherein the return cam is integrated with a stud for engagement with a cruise control system to reduce the number of subassemblies in the assembly and thereby reduce the cost and time to manufacture and assemble the components.

Another object of the invention may be to provide a throttle body having a throttle lever assembly wherein the integrated return cam is formed of polymeric material to reduce the mass of the lever assembly.

Another object of the invention may be to provide a throttle body having a throttle lever assembly wherein the return cam is integrated with a stud for engagement with a cruise control system to reduce the size of the assembly and thereby reduce the packaging room required for the throttle lever assembly in the engine compartment.

Another object of the present invention may be to provide a throttle lever assembly having a throttle shaft with a semi-circular groove disposed transversely across an end portion thereof to retain the return cam that is overmolded over the end portion of the shaft to maintain the return cam in fixed radial and axial relationship to the shaft.

These and other objects, advantages and features of the present invention will become more apparent from the following description and drawings.

BRIEF DESCRIPTION OF THE DRAWINGS

The present invention will now be described, by way of example only, with reference to the accompanying drawings in which.

DESCRIPTION OF THE PREFERRED EMBODIMENT

Figure 1:
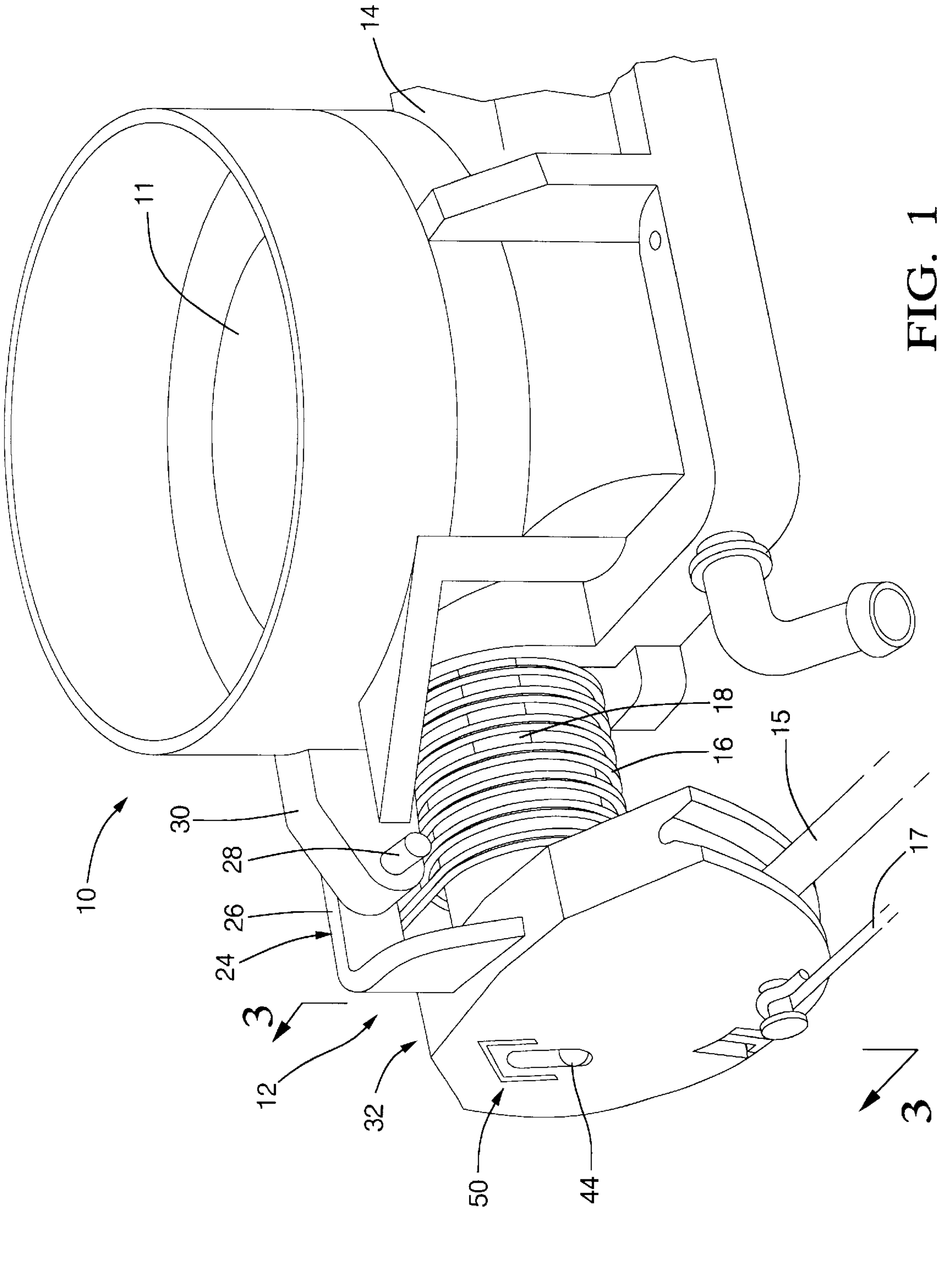
FIG. 1 is a perspective view of a throttle lever assembly embodying the present invention shown mounted to a throttle housing of a fuel injection system.

In FIG. 1, there is shown a throttle body, generally designated 10, for controlling the opening of a throttle valve 11 that delivers air to a combustion chamber of an internal combustion engine. The throttle valve 11 is controlled by a throttle lever assembly 12 pivotally secured within a housing 14. The operator or a cruise control system controls the rotation of the lever assembly 12 which in turn opens and closes the throttle valve accordingly. The operator controls the lever assembly by depressing an accelerator pedal which is interconnected to the lever assembly by an accelerator cable 15. Similarly, the cruise control system is interconnected to the lever assembly by a cable or linkage 17. A spring 16 returns the lever assembly 12 back to the idle position (as shown in FIG. 1) when the operator or cruise control system reduces tension on their respective cables to decelerate the engine.

Figure 2:
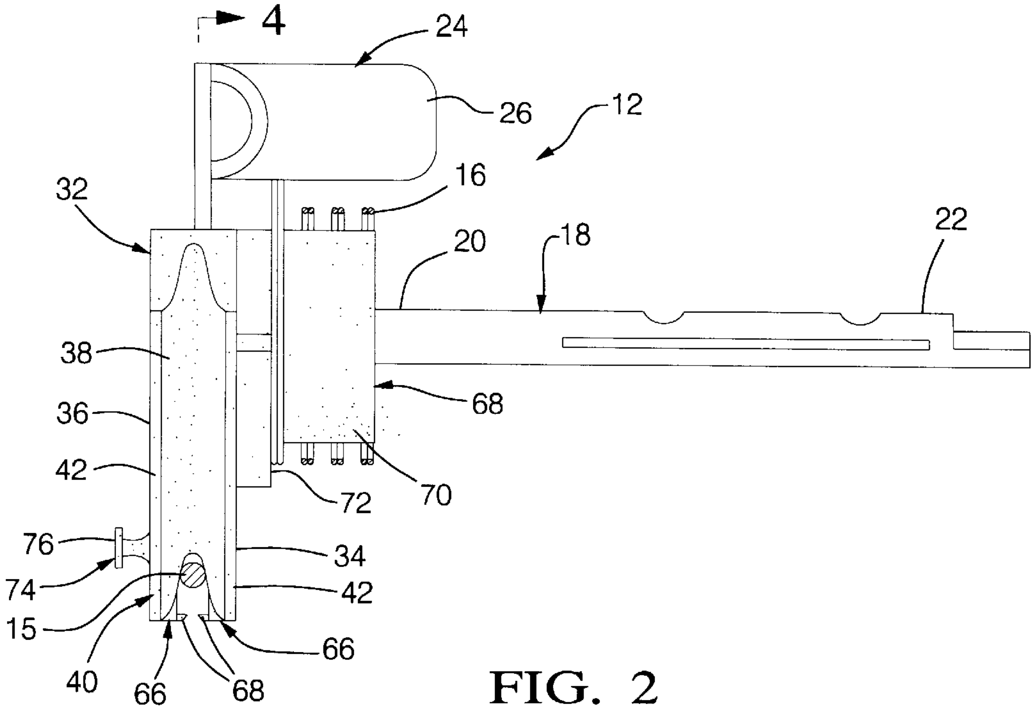
FIG. 2 is an axial view of the throttle lever assembly of FIG. 1 having a return spring shown partially broken away.
Figure 3:
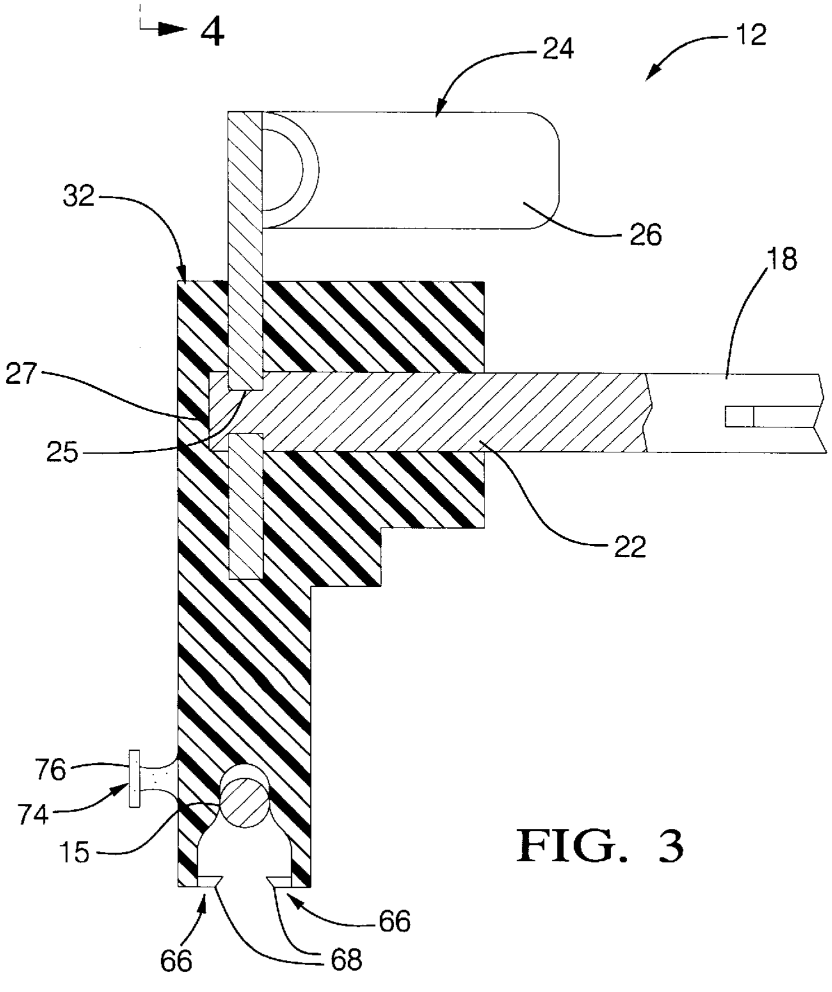
FIG. 3 is a sectional view of a return cam of the throttle lever assembly taken through the line 3—3.
Figure 4:
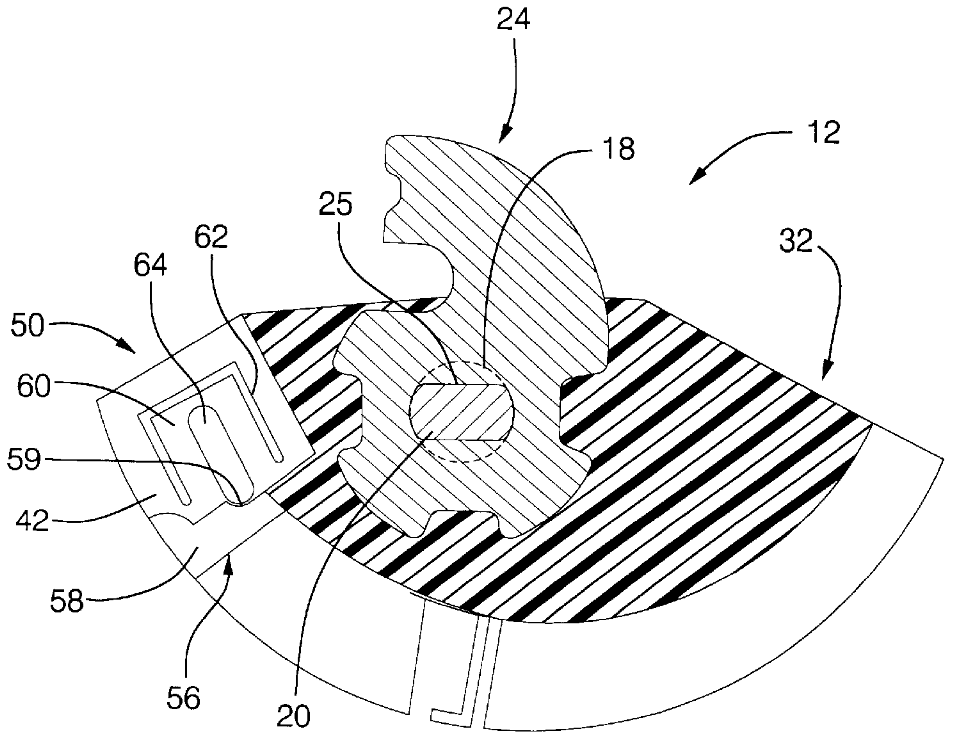
FIG. 4 is a sectional view the return cam of the throttle lever assembly taken through the line 4—4.

As shown in FIGS. 1 and 2, the throttle lever assembly 12 comprises a return cam 32 and an idle stop lever 24 secured to first end 20 of a throttle shaft 18. A second end 22 of the shaft is secured pivotally within the housing 14. The idle stop lever 24 extends radially from the shaft and has a tab 26 that extends towards the housing 14 for engagement with an idle stop screw 28 threaded in a depending member 30 of the housing 14. The first end 20 of the shaft is milled to provide a "double D" profile as shown in FIG. 4, that is complementary to a bore 25 disposed in the idle stop lever 24, which is preferably formed of stamped metal. To secure the shaft 18 to the idle stop lever, the first end 20 of the shaft is fitted within the bore 25 and the shaft is then spun over or expanded at 27 in FIG. 3 to attach the idle stop lever in fixed relation to the shaft to prevent rotational and axial translation of the idle stop lever.

Referring to FIG. 2, the throttle return cam 32, formed of thermoset or thermoplastic material, is molded over the first end 20 of the throttle shaft 18 and a portion of the idle stop lever 24. This process provides for an economical method of manufacturing the throttle lever assembly 12. The return cam 32 is generally semi-circular in shape (see FIG. 4), and has inner and outer radial surfaces, 34, 36. A generally U-shaped channel 38, defined by opposing walls 42, is disposed in its outer peripheral surface 40, opening radially outward for receiving the acceleration cable 15.

Figure 5:
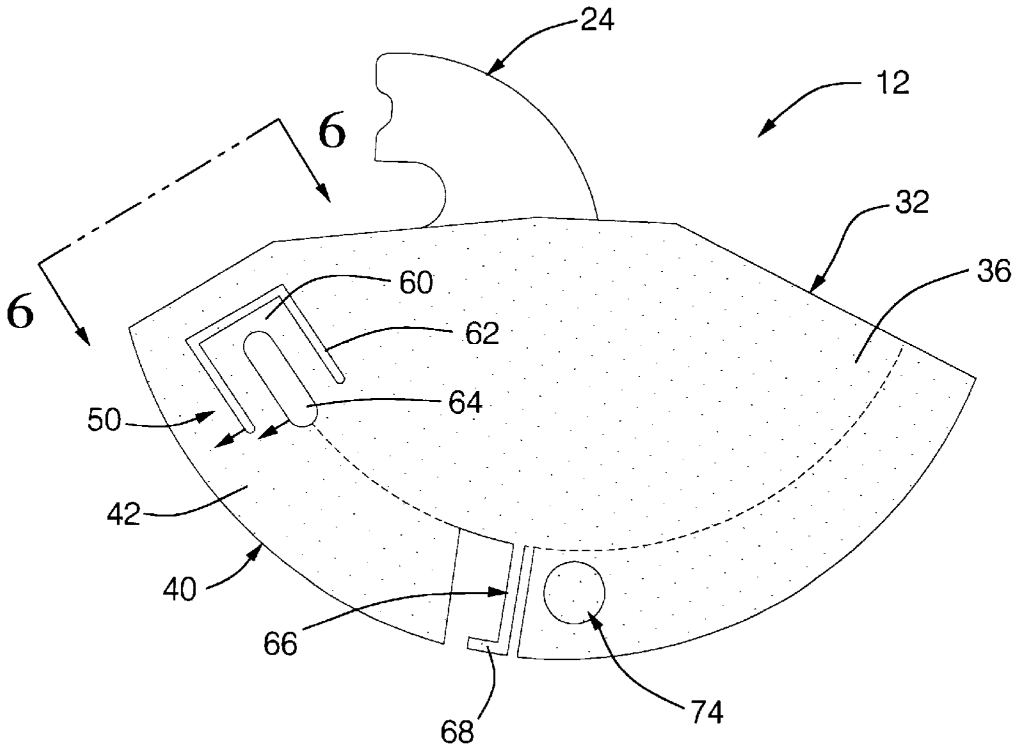
FIG. 5 is a front elevational view of the throttle lever assembly of FIG. 1.
Figure 6:
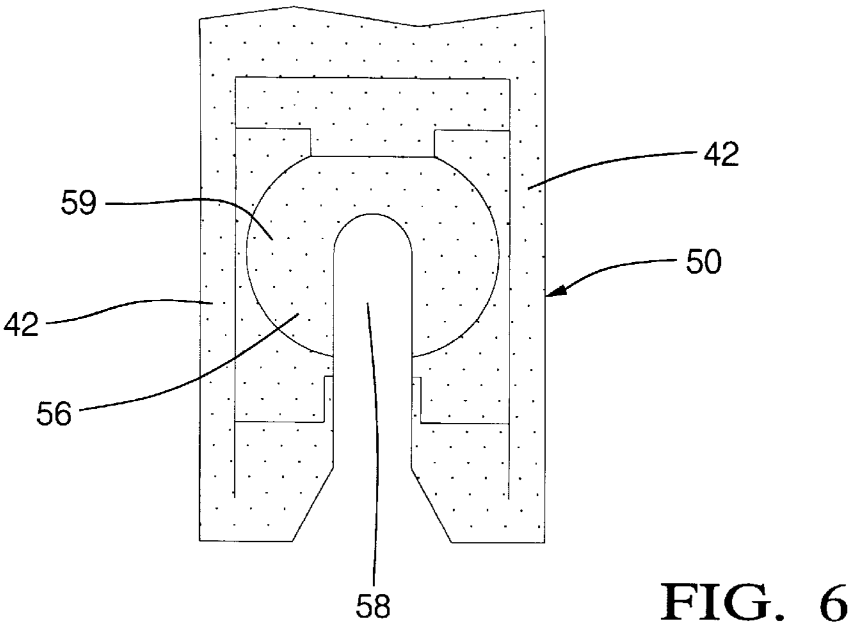
FIG. 6 is an expanded side elevational view of a seat of the throttle lever assembly of FIG. 5 taken through the line 6—6.

Referring to FIG. 1, an end of the cable includes a spherical anchor 44 which permits the accelerator cable 15 to be easily attached to the return cam 32. A seat 50 is provided at one end of the channel 38 for securing the anchor 44 to the return cam. The cable 15 is then threaded through the channel 38 and exits from its other end. Referring to FIGS. 4–6, the seat 50 is defined by the walls 42 of the channel 38 and a forward retaining wall 56 disposed between the walls 42 of the channel. The retaining wall 56 has a slot 58 for passing of the accelerator cable 15 through the retaining wall to the seat and a concave surface 59 for receiving the anchor 44 (see FIG. 1). The anchor is adapted to snap fit into the seat 50 between a pair of resiliently, flexible tabs 60 defined by U-shaped cutout 62 and a slot 64 disposed in each of the walls 42 of the channel 38.

Referring to FIGS. 2 and 5, a pair of opposing clips 66 are integrally formed in the walls 42 of the channel 38 at approximately its midpoint which function to retain the cable within the channel. The clips 66 include inwardly facing depending members 68 that are spaced apart less than the diameter of the cable 15. The clips are resiliently flexible to permit the cable to pass through the clips and into the channel 38.

Figure 7:
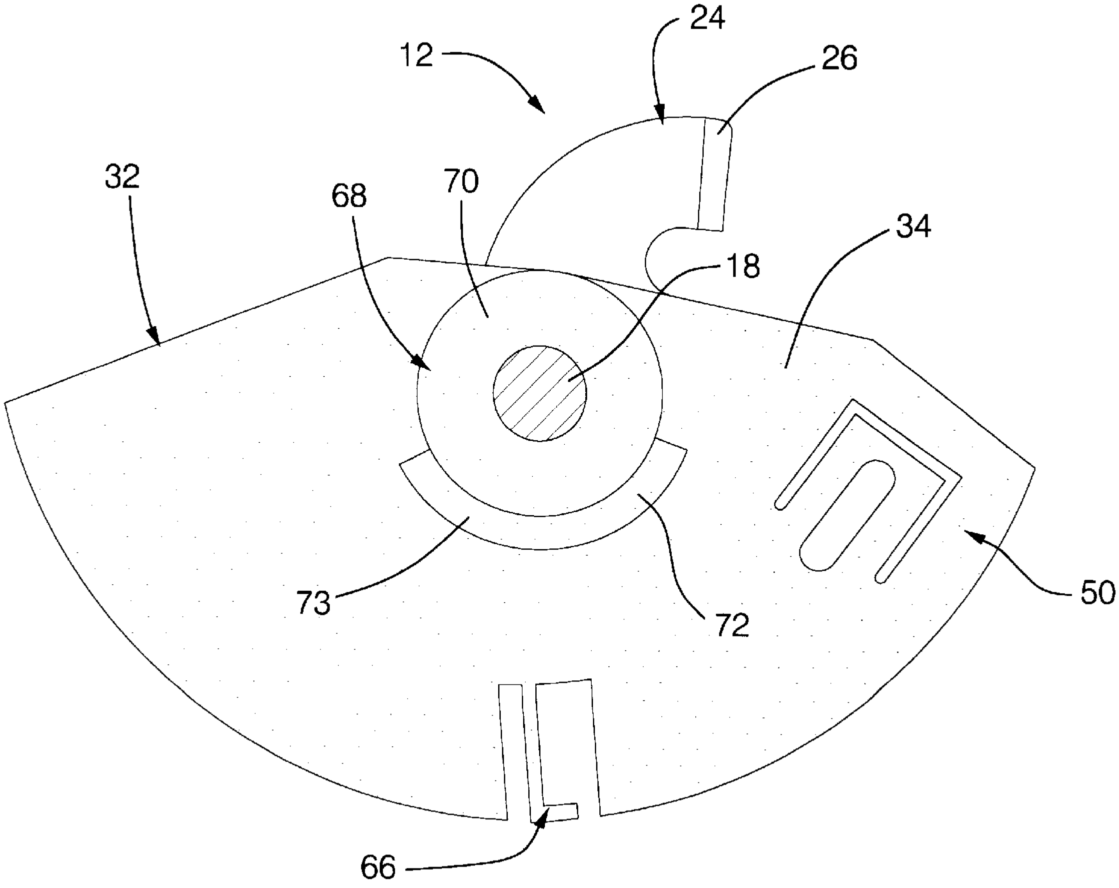
FIG. 7 is a rear elevational view of the throttle lever assembly of FIG. 1.

Referring to FIGS. 2 and 7, the return cam 32 further includes an integrated spring retainer 68 for maintaining the return spring 16 in relative coaxial orientation to the throttle shaft 18. The spring retainer has a cylindrical guide 70 that projects axially from the inner radial surface 34 of the return cam 32. The guide 70 is coaxially disposed with the shaft 18 and has an outer diameter slightly less than the inner diameter of the return spring 16 when fully torqued in the wide open position of the throttle lever assembly 12. The guide 70 extends along the shaft to retain a substantial portion of the length of the spring. The guide further includes a step portion 72 disposed about the periphery of a portion of the guide of the spring retainer to provide a radial engagement surface 73 for retaining the spring. The step portion extends from the inner radial surface 34 of the return cam 32 less than that of the guide 70. The outer diameter of the step portion 72 is greater than the inner diameter of the spring 16 when the return cam 32 is rotated to the idle position to ensure engagement of the spring with the engagement surface 73.

As shown in FIGS. 2 and 5, a stud 74 projects outwardly from and is integrally formed to the outer radial surface 36 of the return cam 32 to provide a means to attach the cruise cable 17 from the cruise control system. The stud has an end cap 76 to retain the cruise control cable or linkage attached thereto. The location of the stud about the periphery of the return cam 32 is determined by the location of the cruise control system relative to the throttle lever assembly.

Figure 8:
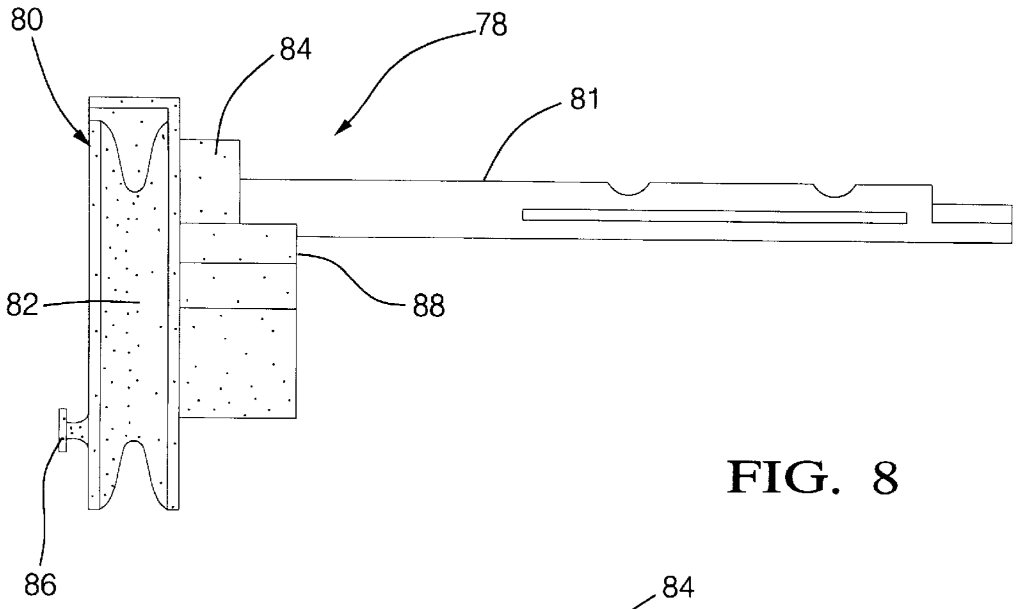
FIG. 8 is an axial view of an alternative embodiment of an throttle lever assembly embodying the present invention.
Figure 9:
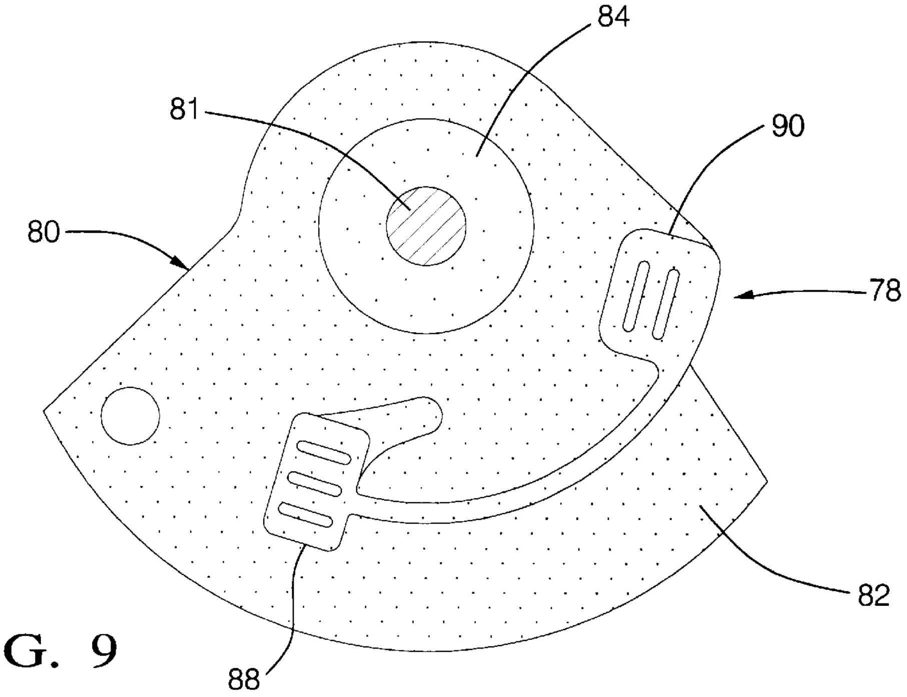
FIG. 9 is a rear elevational view of the alternative embodiment of FIG. 8.

Referring to FIGS. 8 and 9, an alternative embodiment of a throttle lever assembly 78 comprises a cam assembly 80 formed of thermoplastic/thermoset material that is overmolded onto a shaft 81. The unitary cam assembly 80 includes a return cam 82, a spring retainer 84, a cruise control stud 86, an idle stop member 88 and a wide open stop member 90. The return cam 82, spring retainer 84 and cruise control stud 86 are similar to those described hereinbefore. The stop members 88, 90 extend from the return cam to engage the throttle housing 14 (in FIG. 1) when the throttle lever assembly 78 is rotated to a throttle idle position or a throttle wide open position, respectively.

Figure 10:
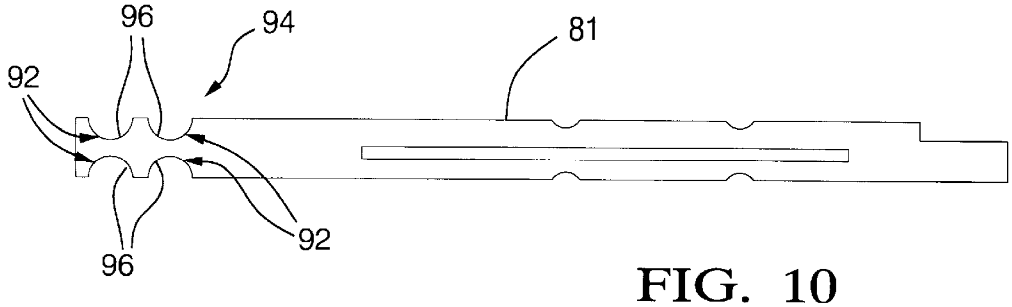
FIG. 10 is an axial view of the shaft of the alternative embodiment of FIG. 8.

Consequently, the elimination of the discrete idle stop lever 24 of FIG. 1 eliminates the support the idle stop lever provided to maintain the return cam 32 in a fixed relationship to the shaft, preventing rotational and axial translation of the return cam on the shaft. To overcome this problem, a pair of adjacent semi-circular grooves 92, shown in FIG. 10, are machined transversely across the top and bottom portions of the end 94 of the throttle shaft 81. The surfaces 96 of the grooves 92 provide support to the return cam 82, when molded over the shaft 81, to prevent axial and rotational translation of the return cam on the shaft. One would recognize that any number of grooves 92 may be machined into the end 94 of the shaft 81 to retain the cam assembly 80.

In the alternative embodiment of FIG. 8, each component of the throttle lever assembly 78 is integrated into a single unitary return cam 82, however, one would recognize that integration of any limited combination of components is possible. For example, the idle stop lever may be integrated only with the return cam, and the cruise stud may be integrated only with the return cam.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A throttle lever assembly for use in a throttle body having a housing and a return spring for urging the lever assembly to an idle position; the throttle lever assembly comprising:

a shaft having first and second end portions, the first end portion rotatably engaging the housing;

an idle stop lever secured to the second end portion of the shaft and extending radially from the shaft at a predetermined distance and angle to engage the housing when the throttle lever assembly is urged to the idle position; and a return cam molded over the second end portion of the shaft and a portion of the idle stop lever, the return cam having first and second radial surfaces with a channel disposed about the periphery of the return cam between the first and second radial surfaces, the channel opening radially outward for receiving an accelerator cable therein.

2. The throttle lever assembly, as defined in claim 1, wherein the return cam further includes a spring retainer for maintaining the return spring in coaxial relationship to the shaft, the spring retainer includes an outer engagement surface projecting axially a predetermined distance from the second radial surface of the return cam, the outer engagement surface being coaxially disposed about the shaft and having an outer diameter less than the inner diameter of the return spring.

3. The throttle lever assembly, as defined in claim 2, wherein the spring retainer further includes a second engagement surface extending radially from a portion of the outer engagement surface at a predetermined distance from the second radial surface of the return cam of the second engagement surface having an outer diameter greater than the inner diameter of the return spring.

4. The throttle lever assembly, as defined in claim 1, wherein the return cam further includes at least one cable retention clip integrally formed in a wall of the channel, the clip having a depending member to maintain the cable within the channel.

5. The throttle lever assembly, as defined in claim 1, wherein the return cam includes a stud projecting axially from the first radial surface of the return cam at a predetermined relationship to the shaft for engaging a cruise control system.

6. A throttle lever assembly for use in a throttle body having a housing and a return spring for urging the lever assembly to an idle position; the throttle lever assembly comprising:

a shaft having first and second end portions, the first end portion rotatably engaging the housing wherein the second end portion includes at least one groove disposed transversely across the shaft; and a return cam molded over the second end portion of the shaft, the return cam having first and second radial surfaces with a channel disposed about the periphery of the return cam between the first and second radial surfaces, the channel opening radially outward for receiving an accelerator cable therein, and an idle stop member integrally extending radially from the return cam at a predetermined distance and angle to engage the housing when the throttle lever assembly is urged to the idle position.

7. The throttle lever assembly, as defined in claim 6, wherein the groove disposed transversely across the shaft is generally U-shaped.

8. The throttle lever assembly, as defined in claim 6, wherein the second end portion of the shaft includes a first pair of adjacent grooves disposed opposing a second pair of adjacent grooves on the shaft.

9. The throttle lever assembly, as defined in claim 6, wherein the return cam further includes a stud projecting axially from the first radial surface of the return cam at a predetermined relationship to the shaft, for engaging a cruise control system.

10. The throttle lever assembly, as defined in claim 6, wherein the return cam further includes a spring retainer for maintaining the return spring in coaxial relationship to the shaft, the spring retainer includes an outer engagement surface projecting axially at a predetermined distance from the second radial surface of the return cam, the outer engagement surface being coaxially disposed about the shaft and having an outer diameter less than the inner diameter of the return spring.

11. The throttle lever assembly, as defined in claim 10, wherein the spring retainer further includes a second engagement surface extending radially from a portion of the outer engagement surface at a predetermined distance from the second surface of the return cam, the second engagement surface having an outer diameter greater than the inner diameter of the return spring.

12. The throttle lever assembly, as defined in claim 6, wherein the return cam further includes at least one cable retention clip integrally formed in a wall of the channel, the clip having a depending member to maintain the cable within the channel.

* * * * *